US010204428B2

(12) United States Patent
Almutiry

(10) Patent No.: US 10,204,428 B2
(45) Date of Patent: Feb. 12, 2019

(54) SYSTEMS AND METHOD FOR RECONSTRUCTING 3D RADIO FREQUENCY TOMOGRAPHIC IMAGES

(71) Applicant: Muhannad Salem S. Almutiry, University City (SA)

(72) Inventor: Muhannad Salem S. Almutiry, University City (SA)

(*) Notice: Subject to any disclaimer, the term of this patent is extended or adjusted under 35 U.S.C. 154(b) by 204 days.

(21) Appl. No.: 15/422,956

(22) Filed: Feb. 2, 2017

(65) Prior Publication Data
US 2018/0218519 A1 Aug. 2, 2018

(51) Int. Cl.
| | | |
|---|---|---|
| *G06T 11/00* | (2006.01) | |
| *G06T 3/40* | (2006.01) | |
| *G01S 13/00* | (2006.01) | |
| *G06K 9/62* | (2006.01) | |
| *G01S 13/89* | (2006.01) | |

(52) U.S. Cl.
CPC .......... *G06T 11/008* (2013.01); *G01S 13/003* (2013.01); *G01S 13/89* (2013.01); *G06K 9/6201* (2013.01); *G06T 3/4053* (2013.01); *G06T 2200/04* (2013.01); *G06T 2207/10044* (2013.01); *G06T 2207/10072* (2013.01); *G06T 2207/30181* (2013.01)

(58) Field of Classification Search
CPC ...... G01S 13/00; G01S 13/003; G01S 13/885; G01S 13/89; G06T 2207/10044; G06T 3/4007; G06T 3/4053; G06T 2207/10072; G06T 2207/30181; G06T 2200/04; G06T 11/003; G06T 11/005; G06T 11/006; G06T 11/008; G06K 9/6201

USPC ................................................. 382/299, 300
See application file for complete search history.

(56) References Cited

U.S. PATENT DOCUMENTS 7,978,346 B1 7/2011 Riza
8,472,745 B2 6/2013 Kameyama
(Continued)

OTHER PUBLICATIONS

Coetzee, S. L., C. J. Baker, and H. D. Griffiths. "Narrow band high resolution radar imaging." Radar, 2006 IEEE Conference on. IEEE, 2006. (Year: 2006).*
(Continued)

*Primary Examiner* — Geoffrey E Summers
(74) *Attorney, Agent, or Firm* — Oblon, McClelland, Maier & Neustadt, L.L.P.

(57) ABSTRACT

According to one or more aspects of the disclosed subject matter, reconstructing 3D radio frequency tomographic images can include detecting a plurality of frequencies of a target and generating a low resolution image for each frequency. Additionally, a high frequency low resolution image can be selected from the plurality of low resolution images to be a reference image. Further, pixel values of the reference image can be obtained and the pixel values of the reference image can be compared to each of the plurality of low resolution images. The method can also include determining new features in each of the low resolution images based on the comparisons, generating a high resolution grid based on the new features determined by the comparisons, wherein the high resolution grid is generated using interpolation, performing deconvolution of the high resolution grid using a Wiener filter, and outputting a high resolution image.

20 Claims, 10 Drawing Sheets

(56) References Cited

U.S. PATENT DOCUMENTS

| | | | |
|---|---|---|---|
| 9,176,226 B1 * | 11/2015 | Sego | G01S 13/90 |
| 9,245,326 B2 | 1/2016 | Salvador et al. | |
| 2015/0331228 A1 | 11/2015 | Horstmeyer et al. | |

OTHER PUBLICATIONS

Sun, Hongbo, Hongchuan Feng, and Yilong Lu. "High resolution radar tomographic imaging using single-tone CW signals." Radar Conference, 2010 IEEE. IEEE, 2010. (Year: 2010).*

Chavez-Roman, Herminio, and Volodymyr Ponomaryov. "Super resolution image generation using wavelet domain interpolation with edge extraction via a sparse representation." IEEE Geoscience and Remote Sensing Letters 11.10 (2014): 1777-1781. (Year: 2014).*

Almutiry, Muhannad, et al. "Exploitation of dominant scatterers for sidelobe suppression in radar tomography." Signal Processing Symposium (SPSympo), 2015. IEEE, 2015. (Year: 2015).*

O. Omer, "High-Resolution Computed Tomography Image Reconstruction in Sinogram Space" Journal of Medical and Bioengineering vol. 3, No. 1, Mar. 2014, pp. 12-16.

M. Broxton, et al., "Wave Optics Theory and 3-D Deconvolution for the Light Field Microscope" Stanford Computer Graphics Laboratory Technical Repor, Jul. 25, 2013, pp. 1-20.

\* cited by examiner

SYSTEMS AND METHOD FOR RECONSTRUCTING 3D RADIO FREQUENCY TOMOGRAPHIC IMAGES

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Radar tomographic imagining has been adapted in many applications, such as below ground remote sensing, because of benefits including low cost and nonionizing radiation. However, Radar imaging can be limited by the bandwidth and the wavelength of the transmitted signal. Higher resolution images may offer more information about a shape of a target, but the high cost of obtaining a higher resolution image by increasing bandwidth and wavelength may not satisfy crowded bandwidths and transmitted power regulations in most countries.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to one or more aspects of the disclosed subject matter, a method of reconstructing 3D radio frequency tomographic images can include detecting a plurality of frequencies of a target and generating a low resolution image for each of the plurality of frequencies. Additionally, a high frequency low resolution image can be selected from the plurality of low resolution images to be a reference image. Further, pixel values of the reference image can be obtained and the pixel values of the reference image can be compared to each of the plurality of low resolution images. The method can also include determining new features in each of the low resolution images based on the comparisons, generating a high resolution grid based on the new features determined by the comparisons, wherein the high resolution grid is generated using interpolation, performing deconvolution of the high resolution grid using a Wiener filter, and outputting a high resolution image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
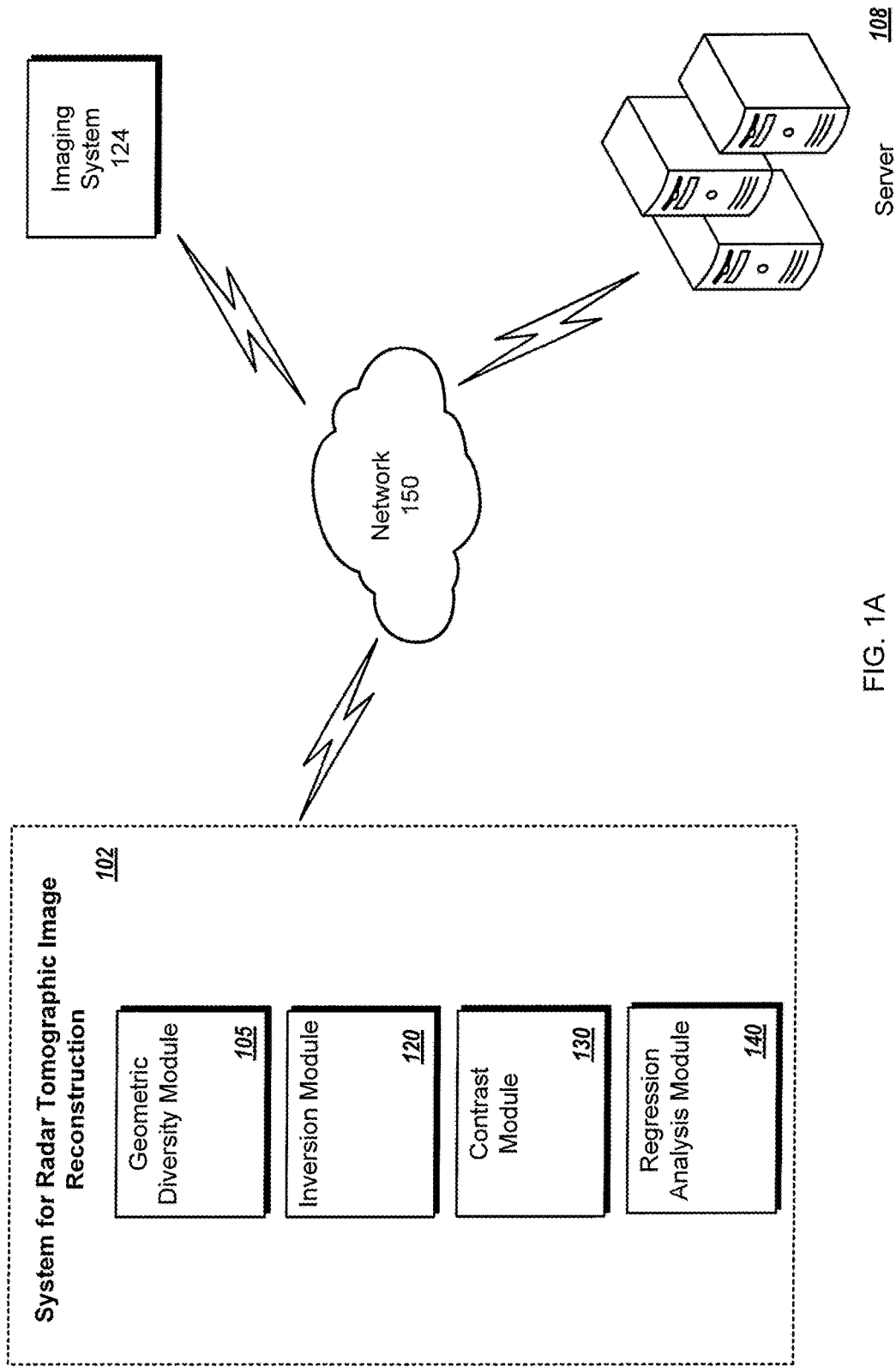
FIG. 1A illustrates a block diagram of a system and environment for tomographic image reconstruction according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper,"

"lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1A illustrates various aspects of an exemplary architecture for implementing a system 102 for Radar tomographic image reconstruction. The high-level architecture includes both hardware and software applications, as well as various data communications channels for communicating data between the various hardware and software components. The architecture may be roughly divided into the system 102 for Radar tomographic image reconstruction, an imaging system 124, a network 150, and a server 108. Each aspect of the architecture may be located, by way of example rather than limitation, in separate geographic locations from each other, including different areas of the same city, different cities, different states, or even different countries.

Each of the imaging system 124 and the server 108 can be configured to transmit data to and/or receive data from the system 102 via the various data communication channels for communicating data between the various hardware and software components. For example, the communication channels may include the network 150. The network 150 may be a proprietary network, a secure public Internet, a virtual private network or some other type of network, such as dedicated access lines, plain ordinary telephone lines, satellite links, combinations of these, etc.

The system 102 for Radar tomographic image reconstruction may include a geometric diversity module 105, an inversion module 120, the contrast module 130, and a regression analysis module 140. Each module may be one or more processors and/or processing circuitry, or share the same processor, wherein each module may perform one or more specific tasks by executing software instructions.

The geometric diversity module 105 can receive information from the imaging system 124. More specifically, the imaging system 124 can provide spatial diversity and frequency diversity information based on the transmitters and receivers associated with the imaging system 124. The transmitters and receivers may be the transmitters and receivers 110 as described in relation to FIG. 1B. The geometric diversity module 105 may perform at least a portion of the operations of the geometric diversity module 105 described in relation to FIG. 1B. For example, the geometric diversity module may be configured to provide the electric field response matrix 115 to the method 200 of FIG. 2. As illustrated in FIG. 1A, the geometric diversity module 105 may be configured to share the outcome of its evaluation, such as the electric field response matrix 115, with the inversion module 120.

Figure 1B:
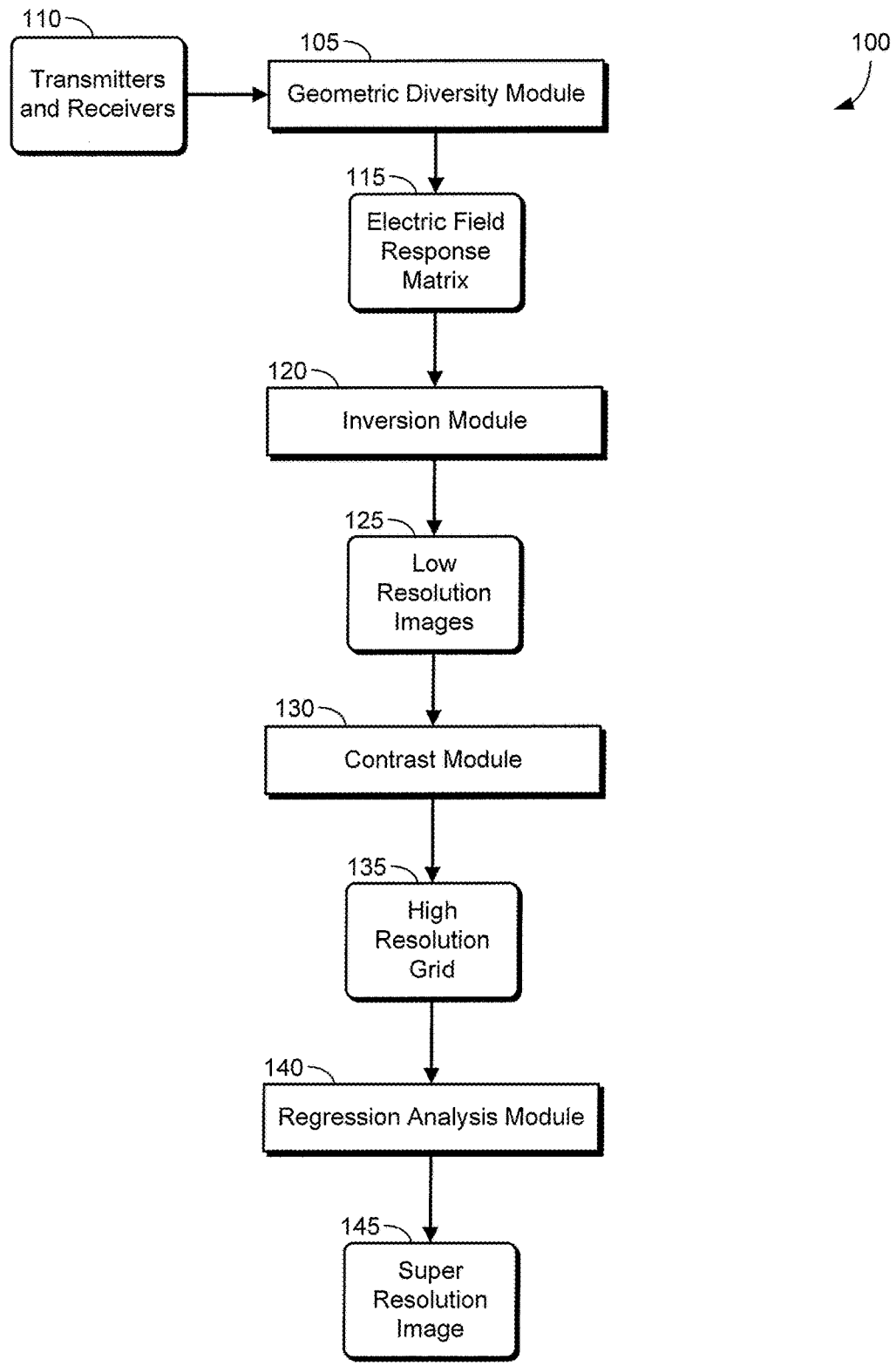
FIG. 1B depicts an exemplary Radar tomographic image reconstruction workflow according to one or more aspects of the disclosed subject matter.

The inversion module 120 can receive information from the geometric diversity module 105, such as the electric field response matrix 115, for example. The inversion module 120 may perform at least a portion of the operations of the inversion module 120 described in relation to FIG. 1B. For example, the inversion module 120 may be configured to execute the method 200 of FIG. 2. As illustrated in FIG. 1B, the inversion module 120 may be configured to share the outcome of its evaluation, such as the low resolution images 125 (e.g., the low resolution vector images 410), with the contrast module 130.

The contrast module 130 can receive the low resolution images (e.g., low resolution vector images 410) from the inversion module 120. The contrast module 130 can perform at least a portion of the operations of the contrast module 130 described in relation to FIG. 1B. For example, the contrast module may be configured to execute the method 300 of FIG. 3. As illustrated in FIG. 1A, the contrast module 130 may be configured to share the outcome of its evaluation, such as the high resolution grid 135, with the regression analysis module 140.

The regression analysis module 140 can receive information from the contrast module 130, such as the comparison of each vector image (e.g. low resolution vector images 410) with the reference image (e.g., high frequency low resolution image). A reference image is selected based on the high frequency image having the highest wavelength in a predetermined bandwidth. The regression analysis module 140 may perform at least a portion of the regression analysis described in relation to the workflow of FIG. 1B. For example, the regression analysis module 140 may generate the super-resolution Radar tomographic image (e.g., super resolution image 145). The super-resolution image may be based on low resolution images (e.g., low resolution vector images 410).

The server 108 can provide storage and/or processing for the system 102 and the operation of each of the geometric diversity module 105, the inversion module 120, the contrast module 130, and the regression analysis module 140.

FIG. 1B depicts an exemplary Radar tomographic image reconstruction workflow 100 according to one or more aspects of the disclosed subject matter. The Radar tomographic image can be generated by diverse geometric scanning. The geometric diversity can include spatial diversity and frequency diversity at the predetermined bandwidth. A combination of the spatial diversity and the frequency diversity can overcome limitations caused by diffraction and frequency resolution. The frequency diversity can correspond to analyzing a plurality of frequencies within a bandwidth. For example, the frequency diversity can include a range from 2 GHz to 18 GHz, corresponding to 16 degrees of freedom in the predetermined bandwidth. The spatial diversity can be achieved by deploying one or more transmitters and one or more receives in multiple locations. The spatial diversity can provide additional angle view information about a target. More specifically, the spatial diversity provides angle view information of a target which leads to obtaining more information about the target shape features. In other words, the target can be viewed from a plurality of different angles. Each angle of tomographic scanning geometry provides additional information about the target shape features. The Radar tomographic image can be reconstructed by solving for an inverse of a linear relationship between a contrast function of the targets and a measured scattering field under a first order Born approximation. The scattering field corresponds to received electromagnetic waves (signal) from the target. Additionally, the Radar tomographic image can be imaged in one frequency because the Radar imaging techniques are independent of the bandwidth. Because a single frequency can be used to capture each Radar tomographic image, the image quality can be based on the frequency as some frequencies may provide a clear view of a measurement domain in which the Radar tomographic image is being captured. Additionally, a predetermined frequency may provide a strong scattering field in one or more angles of scanning. As a result, the overall image quality can be increased by registering the information occurring in different frequencies and utilizing the spatial diversity and the frequency diversity in a bandwidth of multiple frequencies. Additionally, a regression analysis can be applied to information identified through comparison of the low resolution images and reference image for each low resolution image. Each scanned frequency may provide a varied Radar cross-section of the targets where a peak contains more energy of the scattering field and a null portion is a weak portion of the scattering field. The geometric diversity of the transmitters and the receivers can be fixed such that a peak or a null of the scattering fields can be received on a single frequency mode. The frequency diversity may change a value of the scattering field by receiving a null for some frequencies and a peak for another set of frequencies for a predetermined set of receivers or a single receiver, for example. New information determined based on a peak or a null can be included in a high resolution grid. A low resolution image can be created for each frequency in a predetermined bandwidth based on the data from the transmitters and receivers 110. Using a low resolution image from each frequency increases computation efficiency and reduces computational cost. Each low resolution image may contain new information of the target. The new information may include conductivity, permittivity, and penetrating length through the target. With respect to the new information (e.g., the intensity of the pixel), the comparison of pixel intensity to a reference image can be obtained by calculating a regression of all images after assigning the reference image as a base image. The new information (i.e., new features) of the image at each frequency can be registered to a reference image, interpolated, and regressed to generate the super-resolution Radar tomographic image.

The Radar tomographic image reconstruction workflow 100 can represent the various hardware modules described previously with respect to FIG. 1A that can receive and transmit information between each hardware module corresponding to one or more processes for generating a super resolution image. The Radar tomographic image reconstruction system 102, for example, may be integrated with an imaging system that produces predetermined outputs at each module in response to receiving an input. One or more hardware modules in the Radar tomographic image reconstruction workflow 100 may receive data from the imaging system. The imaging system may include transmitters and receivers 110. The transmitters and receivers 110 may be radar transmitters and receivers. For example, the radar transmitters and receivers can be configured to output a radar signal in a predetermined scan mode, and signals corresponding to the features of a location are received at the radar receivers. The imaging system may utilize a multistatic Radar scan mode which can generate an independent image for each frequency, (as opposed to other techniques that request at least two parameters for generating an image). The multistatic Radar scan mode can correspond to transmitting a signal from a transmitter (e.g., via the transmitters and receivers 110) at one location and receiving the signal from multiple receivers (e.g., via the transmitters and receivers 110) at multiple locations. For comparison, three modes of Radar can include a monostatic mode, where the transmitter and the receiver are at the same location, a bistatic mode, where the transmitter is at one location and the receiver is at a different location, and the multistatic (tomographic) mode, where the transmitter is in one location and multiple receivers can be at different locations. Further, the multistatic mode can also include multiple transmitters. The geometric diversity module 105 can receive more robust angle view information about the targets as a result of the spatial diversity of the transmitters and receivers 110. Additionally, the geometric diversity module 105 can collect a measured scattering field of a predetermined bandwidth, where the bandwidth corresponds to the range of frequencies of the low resolution images. As a result, the geometric diversity module 105 can generate an electric field response matrix 115.

The independent images at each frequency improve an estimation of the electric field response in each pixel location. The electric field response matrix 115 can be generated by obtaining a contrast function of a measurement domain, the measurement domain being the range of frequencies corresponding to the frequency diversity. A linear relationship can be applied to generate the contrast function from the electric field response of the transmitters and receivers 110 at each location of the measurement domain. The Radar tomographic image can be represented as cells of the matrix where each cell can represent a contrast value at a certain location. As seen in Equation 1 below, the contrast function can be represented by a tomographic image by dividing the measurement domain in O cells (i.e., pixels). The scattered field can be represented as a vector of MN·1.

$$E^S(r_n^t, r_m^r) \cong Q \sum_{o=1}^{O} [\hat{a}_m^r \overline{G}(r_m^r, r_o)][\overline{G}(r_o, r_n^t) \hat{a}_n^t] V(r_o) \quad \text{Equation 1}$$

With respect to Equation 1, r is the distance between the electric source and the location of the pixel. $\overline{G}(r_m^r, r_o)$ and $\overline{G}(r_o, r_n^t)$ is the Green function that calculates the electric field response of the source to any location of the one or more receivers. More specifically, the Green function uses the location of the source (e.g., transmitter or receiver) in an xyz plane and the location of the pixel in the xyz plane to calculate the electric field response at the pixel location in the measurement domain. $\hat{a}_m^r$ and $\hat{a}_n^t$ are the polarization of the transmitter and receiver. Q is an adaptive value to match the wavenumber and current value of the radiation source. The matrix form as the relationship can be expressed as $$E^S(r_n^t r_m^r) = L(V(r')) \quad \text{Equation 2}$$

The electric field response matrix 115 can be provided to inversion module 120. Because L is not a square matrix and is ill-posed, a Hermitian transpose can be used to obtain the contrast vector V as a simple solution of the inverse problem which can generate an image of the measurement domain. The Radar tomographic image can be reconstructed for each frequency in the measurement domain (i.e., low resolution images 125), which can later be combined to generate a high resolution image generated from multiple low resolution images 125 of the same scene. Further, because the number of low resolution images 125 is predetermined based on the frequencies in the measurement domain, a shift space is random, and the target is non-rotating, aliasing can be avoided by estimating a shift in each low resolution image 125 based on non-uniform interpolation. The aliasing in the Radar images can occur where updated information is written over previous information, (e.g. an edge in a target can be viewed as previous information and its pixel values will be added to an incorrect location as the pixels are expanded). By estimating the shift space, the updated information can correspond to the correct pixel location, thereby avoiding aliasing.

The low resolution images 125 can be provided to contrast module 130. The contrast module 130 can choose a higher frequency low resolution image to be a reference image. The higher frequency low resolution image can be chosen as the reference image because the higher frequency image may have higher resolution compared to a lower resolution image from the same bandwidth set. Each low resolution image 125 may have a new feature compared to a previous lower resolution image 125. Each new feature appearing in the image set can be registered to the reference image. Each new feature can be determined at least in part by the scattering field. As a result of registering each new feature to the reference image, a non-integer shift of the target feature can be estimated. The non-integer shift can include target features including edges, surface, a penetration distance through the target, and the like. The shift in the target feature may correspond to the contrast function as a shift in the cells (i.e., pixels). As a result, sub-cell shifts or inter-cell distances can be generated between each of the low resolution images 125 in xy dimensions with respect to the reference image. More specifically, inter-image displacements can be found by registering each low resolution image 125 to the reference image. The inter-image displacement can correspond to a difference between the reference image and the low resolution image when more information of the target is collected. Rotations may be also be taken into account if the target is moving. As a result, the contrast module 130 can generate a high resolution grid 135. The high resolution grid 135 can be generated by bicubic interpolation of all low resolution images. The shift based on the reference image can be then be estimated. Additionally, the estimated shift from all low resolution bicubic interpolated images can be non-uniformly interpolated to generate the high resolution grid.

The high resolution grid 135 can be provided to regression analysis module 140. To further prepare the high resolution grid 135 to be provided to the regression analysis module 140, the pixel value of the high resolution grid 135 can be obtained. Since non-integer random shift can be estimated in low resolution images 135, low resolution images 135 can be prepared by adding the estimation shift to all x and y coordinates of all the low resolution pixels. The low resolution pixels can be concatenated for all x and y coordinates. Additionally, the scattered data can be interpolated on the high resolution grid. The interpolating process may be done because any new features may be smaller than the pixel size of the low resolution image. As a result, the value of the uniform high resolution grid can be three times the pixel size of the low resolution images 125. In addition, the high resolution grid 135 can include all concatenated data of all images at x and y coordinates by interpolating the scattered data to the high resolution grid 135 by estimating pixels as shown in FIG. 2.

The high resolution grid can be further improved by performing deconvolution using a Wiener filter. A moving average filter can be used as a Point Spread Function which can be a spatial average operator. The point spread function can be modeled to associate with the wavelength of the highest frequency in the bandwidth $\lambda_m$ and the resolution of the low resolution images 125. For example, the low resolution pixel can have rectangular dimensions dx and dy. The dimensions of the pixel can be related to the wavelength to prevent redundantly reconstructing a tomographic image of the scene having a small pixel size that will not exceed the natural limits of the resolution of the tomographic image. The Point Spread Function can be transformed by taking discrete symplectic Fourier transform (DSFT). Similarly, the DSFT can be taken for the input image, the Wiener filter can be applied to the output of the Point Spread Function to remove noise, thereby completing the regression analysis in the regression analysis module 140. In other words, after obtaining the non-uniformly interpolated high resolution grid, the moving average filter (point spread function) can be applied to the data to regress the data based on the filter size. As a result, super resolution image 145 can be generated by the regression analysis module 140.

Figure 2:
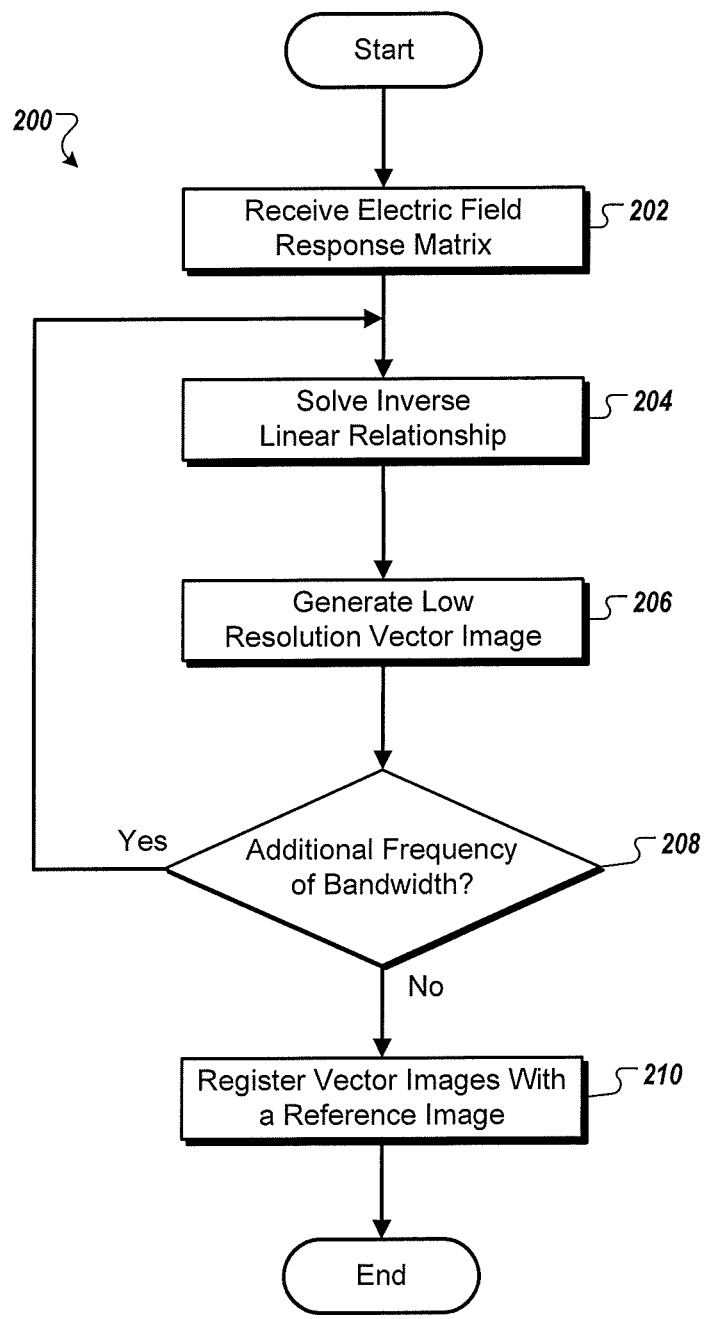
FIG. 2 depicts an algorithmic flow chart of an exemplary method for registering a vector image with a reference image according to one or more aspects of the disclosed subject matter.

FIG. 2 depicts an algorithmic flow chart of an exemplary method 200 for registering a vector image with a reference image according to one or more aspects of the disclosed subject matter. More specifically, the measurement domain can be divided into pixels, the pixel values being obtained by solving the inverse problem which can correspond to the linear relationship between the scattering field and the Green function matrix (L from Equation 2). The measurement domain can be divided into a larger pixel size to reduce the number of unknowns in the inverse problem, and the increased pixel size produces low resolution images. In other words, a vector image can be the output of solving the inverse problem to determine the vector, and the vector can be formed into a matrix to obtain a low resolution image. The software instructions may be executed by processing circuitry of the inversion module 120.

In some implementations, the method 200 begins with the inversion module 120 receiving the electric field response matrix (202). For example, the electric field response matrix can be the electric field response matrix 115 as described in FIG. 1B. The electric field response matrix can be generated at least in part by the measured scattering field which can include the peaks and nulls of the Radar tomographic image. More specifically, the electric field response matrix can be generated based on locations of the transmitters and receivers, operation frequency, and the location of the measurement domain to determine a theoretical scattering field. When the electric field response matrix is generated for another operation frequency in the bandwidth set, the null and peak in the electric field distribution matrix can be determined. The scattering field can be measured via an imaging system including receivers and transmitters (e.g., the receivers and transmitters 110 described in relation to FIG. 1B).

Additionally, in some implementations, processing circuitry of the inversion module 120 can solve inverse linear relationships (204) by using the measured scattering field and the contrast function. By receiving the scattering field from the receivers and transmitters (E) and a theoretical electric field response matrix of the transmitters and receivers (L), which can be calculated by Green's function, the contrast function of the measurement domain (i.e., the image) (V) can be given by E=LV and solved inversely by V=E/L. Therefore, the contrast function can be obtained by applying the inverse problem.

As a result of solving the inverse problem in (204), processing circuitry of the inversion module 120 can generate low resolution vector images (206). The low resolution images can be the low resolution images 125 as described in relation to FIG. 1B. The low resolution images 125 can correspond to an image for each frequency in a measurement domain.

Further, the processing circuitry of the inversion module 120 can determine if there are additional frequencies in the bandwidth corresponding to the measurement domain (208). The method may repeat by solving the inverse linear relationship (204) for each frequency of the bandwidth. More specifically, the method may repeat by solving the inverse problem as a linear relationship between the scattering field and the electric field response.

Upon completion, in some implementations, the low resolution vector images (e.g., low resolution images 125), which are based at least in part on the scattering field, may be registered with a reference image (210). The reference image (chosen from the measurement domain set of frequencies) may have a higher frequency than the low resolution image 125 to which the reference image is being compared.

Figure 3:
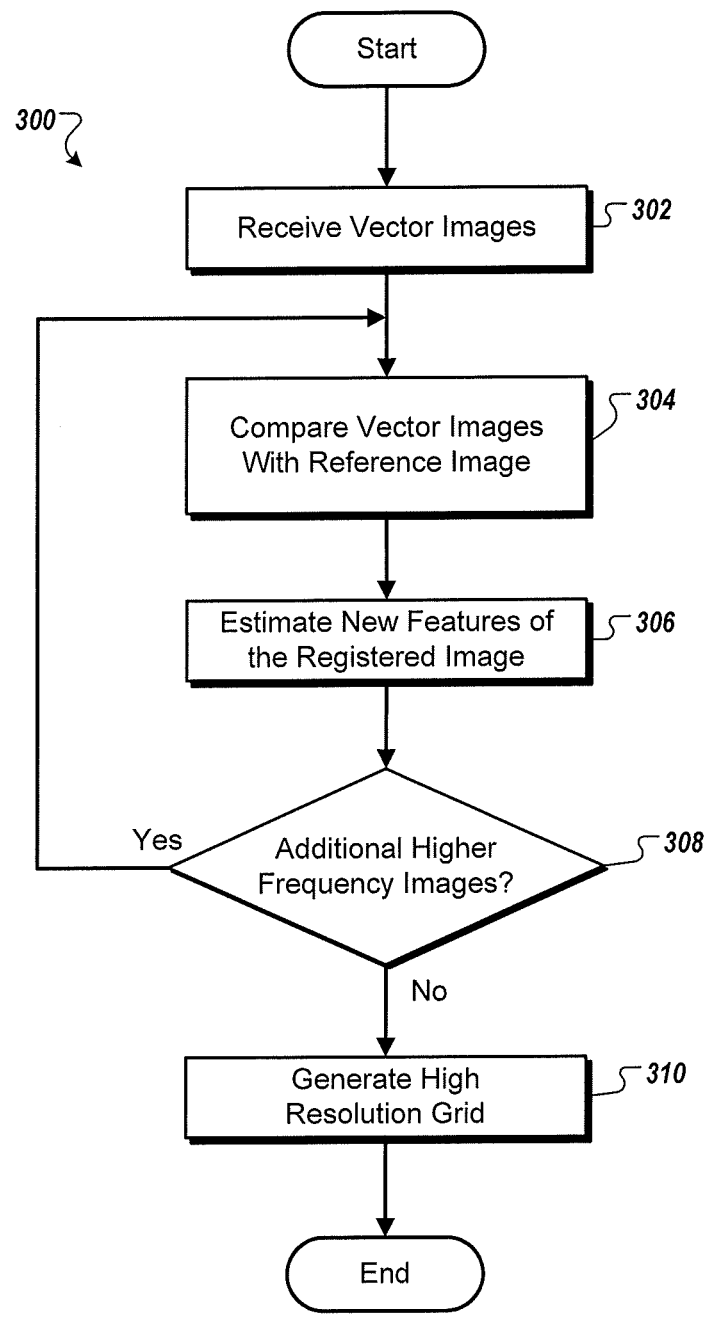
FIG. 3 depicts an algorithmic flow chart of an exemplary method for generating a high resolution grid according to one or more aspects of the disclosed subject matter.

FIG. 3 depicts an algorithmic flow chart of an exemplary method 300 for generating a high resolution grid (e.g., high resolution grid 405 of FIG. 4) according to one or more aspects of the disclosed subject matter. The software instructions may be executed by processing circuitry of the contrast module 130.

In some implementations, the contrast module 130 can receive vector images (302). The vector images can be the low resolution images 125 as described in relation to FIG. 1B and/or the set of low resolution images 410 of FIG. 4.

In some implementations, the processing circuitry of the contrast module 130 can compare the vector images with the reference image (304). A registered reference image can result from the comparison of the vector images with the reference image as the registered reference image can include the registering of each new feature to the reference image. The comparison can include identifying non-integer shift of the target feature such as edges, surface, and penetration.

As a result of the comparison (304), the processing circuitry of the contrast module 130 can estimate new features of the vector image (306) (e.g., low resolution images 125, 410).

The method may repeat (308) comparing the vector images with registered reference images (304) for any additional higher frequency images corresponding to reference images.

Upon completion, in some implementations, the processing circuitry of the contrast module 130 can generate a high resolution grid (310). The high resolution grid can be the high resolution grid 405 as described with relation to FIG. 4.

Figure 4:
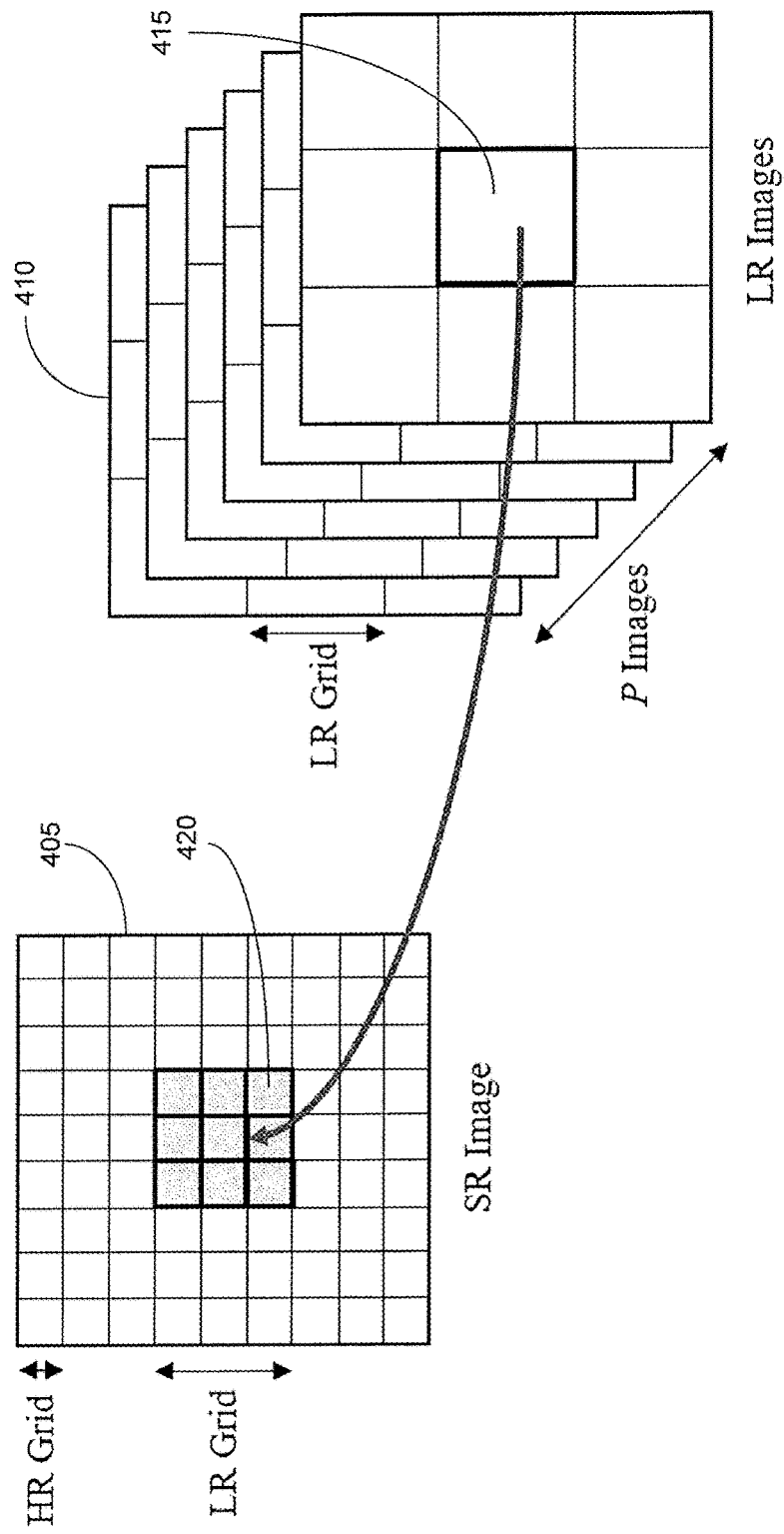
FIG. 4 depicts an exemplary overview of a high resolution grid according to one or more aspects of the disclosed subject matter.

FIG. 4 depicts an exemplary overview of a high resolution grid 405 according to one or more aspects of the disclosed subject matter.

The high resolution grid 405 may be generated via interpolation of new features that have been estimated via comparison of the low resolution images to the reference image, the reference image being the low resolution image with the highest frequency, for example. The low resolution images 410 can correspond to P images where P images can be the number of frequencies in the measurement domain. By determining new features in each of the low resolution grids 415 and comparing the features to previous low resolution images 410, the position of the features, for example, can be translated to the high resolution grid 405. More specifically, features identified in a low resolution grid 415 may be compared to a high resolution section 420 in the high resolution gird 405. After registering any new features from the low resolution images, all the updated feature data can be interpolated based on comparing the registered features to the reference image.

Figure 5A:
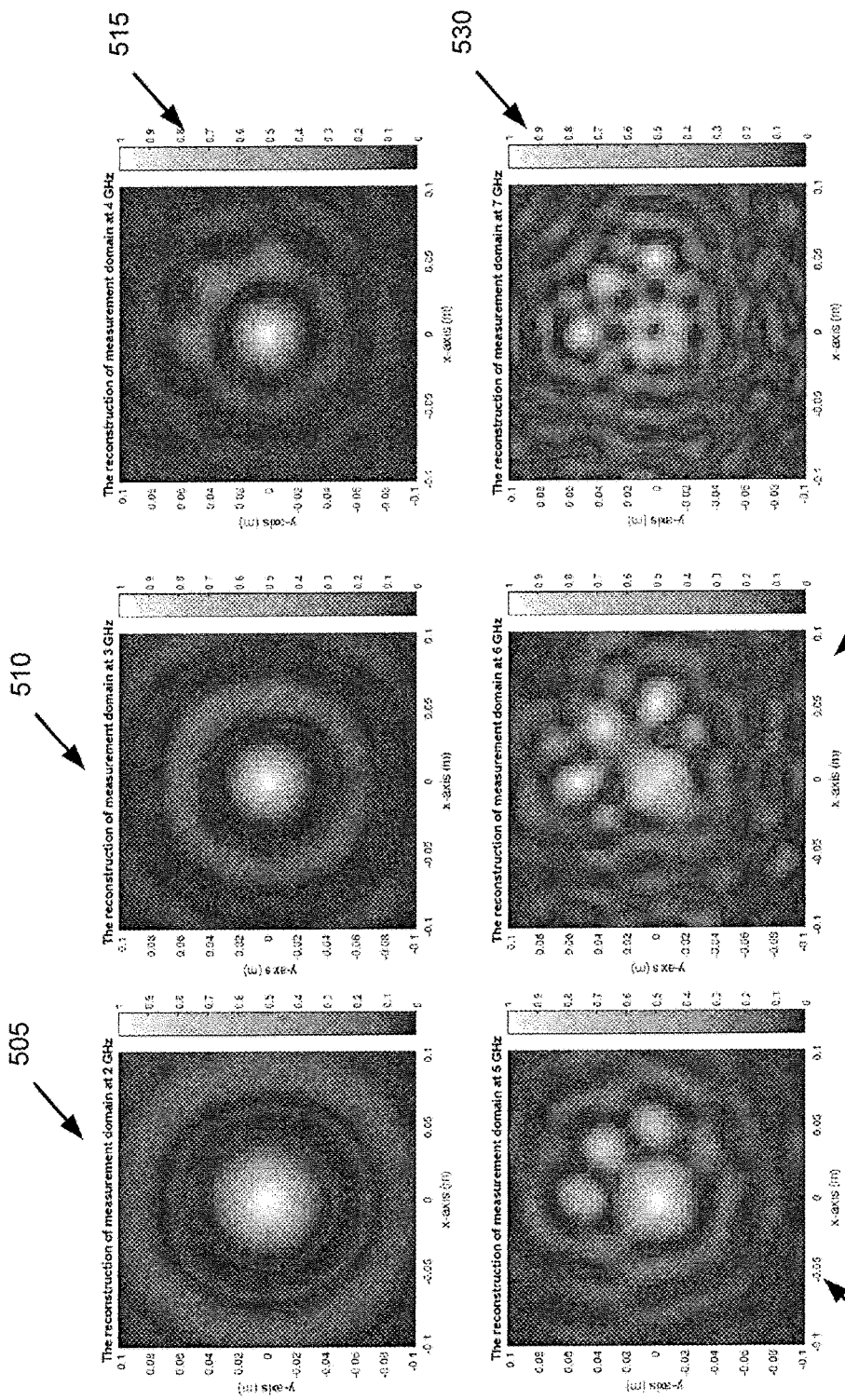
FIG. 5A depicts exemplary low resolution reconstructed images from 2 GHz to 7 GHz according to one or more aspects of the disclosed subject matter.
Figure 5B:
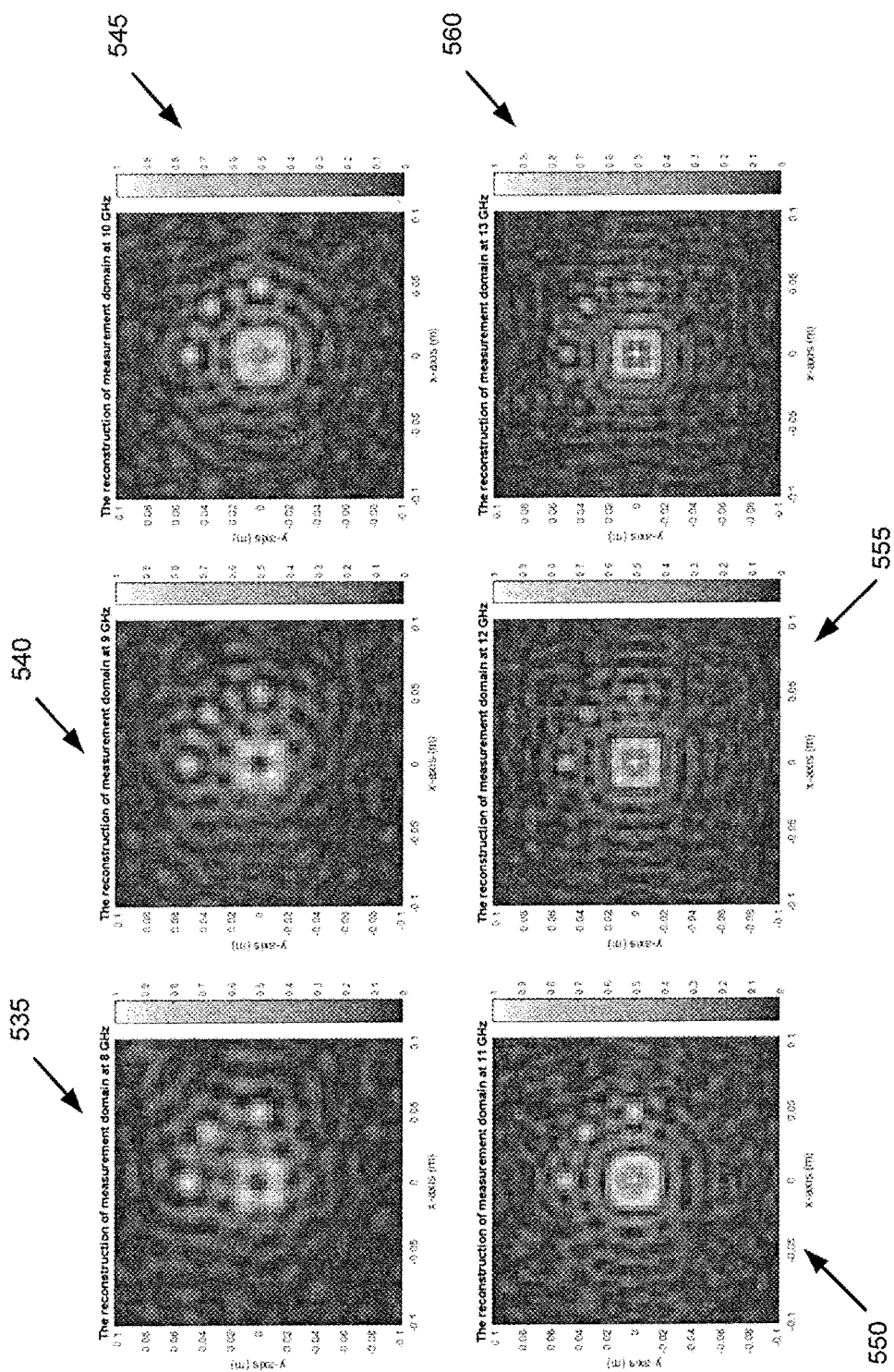
FIG. 5B depicts exemplary low resolution reconstructed images from 8 GHz to 13 GHz according to one or more aspects of the disclosed subject matter.
Figure 5C:
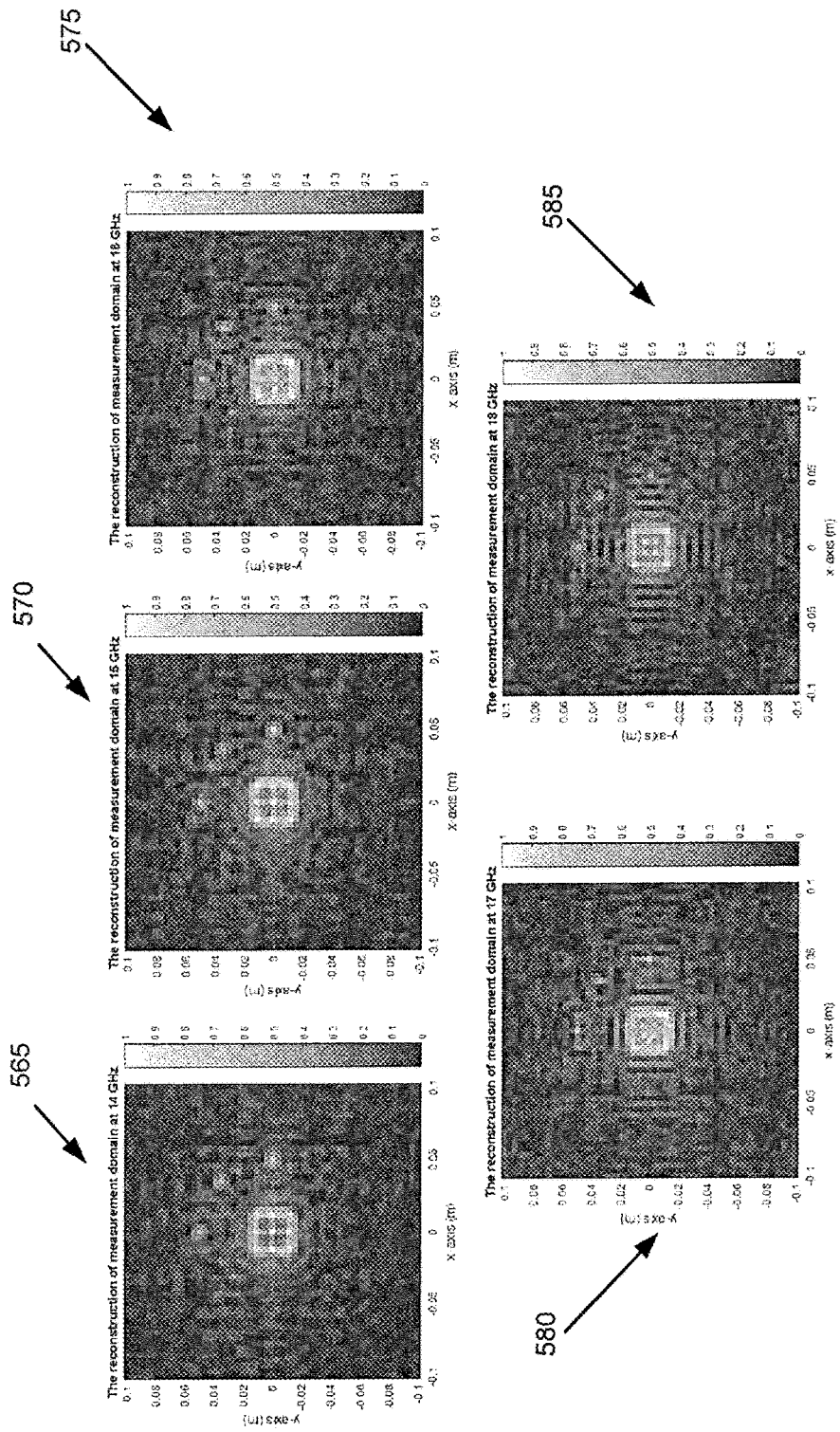
FIG. 5C depicts exemplary low resolution reconstructed images from 14 GHz to 18 GHz according to one or more aspects of the disclosed subject matter.

FIGS. 5A-5C depict exemplary low resolution reconstructed images (e.g., the low resolution from 2 GHz to 18 GHz according to one or more aspects of the disclosed subject matter.

Reconstruction 505, 510, 515, 520, 525, 530, 535, 540, 545, 550, 555, 560, 565, 570, 575, 580, and 585, can correspond to 2 GHz, 3 GHz, 4 GHz, 5 GHz, 6 GHz, 7 GHz, 8 GHz, 9 GHz, 10 GHz, 11 GHz, 12 GHz, 13 GHz, 14 GHz, 15 GHz, 16 GHz, 17 GHz, and 18 GHz, respectively. As the frequency increases, the resolution may also increase. The increased resolution may be based on different characteristics detectable at a specific frequency, for example.

Figure 6:
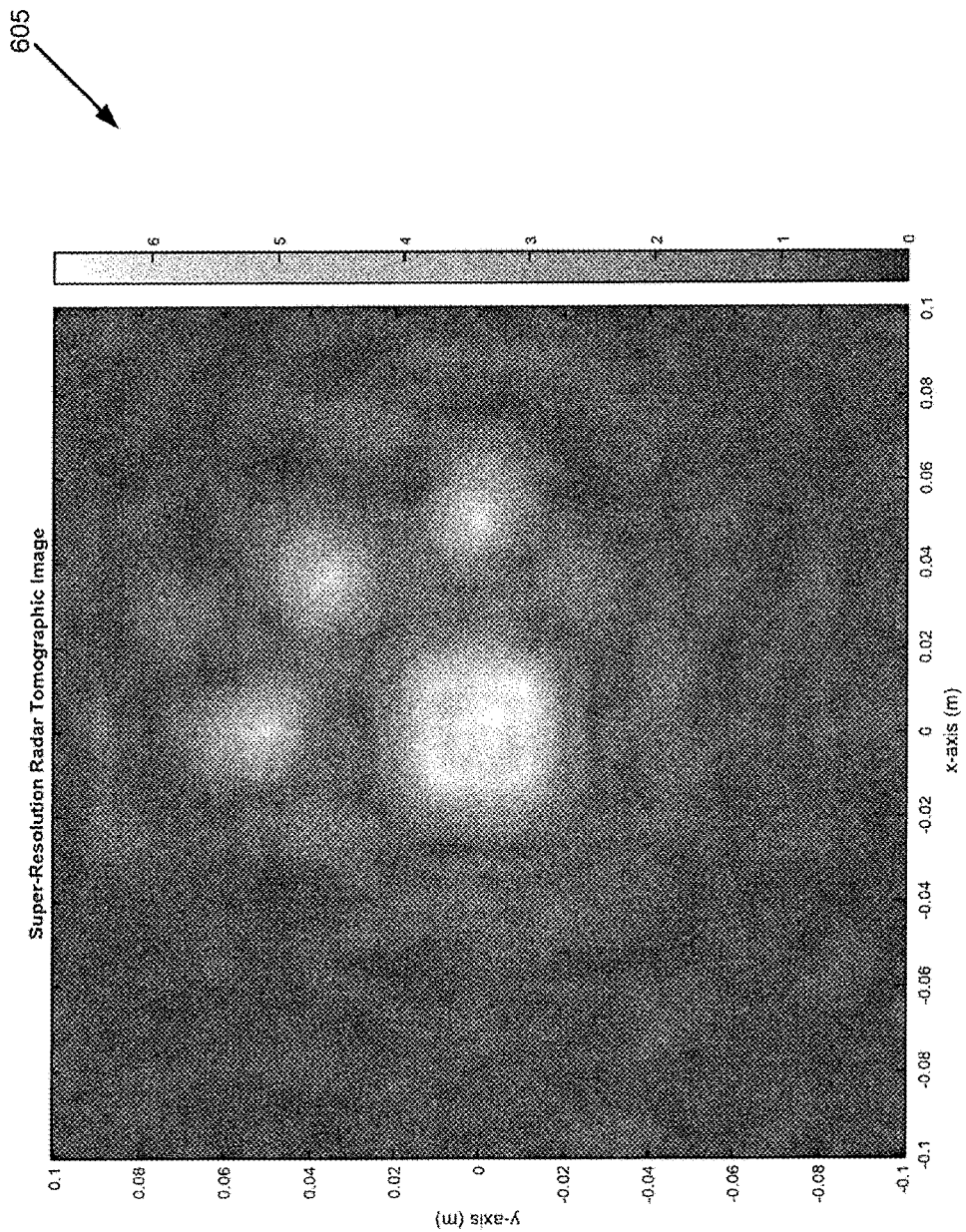
FIG. 6 depicts an exemplary super-resolution Radar tomographic image according to one or more aspects of the disclosed subject matter.

FIG. 6 depicts an exemplary super-resolution Radar tomographic image 605 according to one or more aspects of the disclosed subject matter. The super-resolution Radar tomographic image 605 may be generated via a regression of the information contained in the high resolution grid (e.g., high resolution grid 405 of FIG. 4). More specifically, after interpolation of the new features, it can be determined whether a new registered feature belongs in the interpolated data set based on the regression. More specifically, the regression can include determining the relationship between the registered features and the interpolated data using the Weiner filter.

Advantages of the system for reconstructing 3D radar tomographic images include reducing bandwidth and wavelength limitations by capturing low resolution images for each frequency of a predetermined bandwidth, thereby reducing the bandwidth and wavelength of the transmitted signal. Additionally, the geometric and frequency diversity of the scanning can exceed limitations caused by diffraction and frequency resolution. This system significantly improves on previous systems that require significant bandwidth and power. In fact, the cost of obtaining higher resolution images using previous systems will not satisfy the crowded bandwidth and transmitted power regulations in most countries. As a result, the low cost high resolution Radar tomographic techniques as described herein are a significant technical improvement to a technical problem. The technology vastly improves over previous solutions that require a large bandwidth. Additionally, the technology is a significant improvement over previous solutions such as synthetic aperture radar because the previous solutions require two parameters to create an image, rather than one parameter as described herein. Further, the low computational cost improves real time processing.

Figure 7:
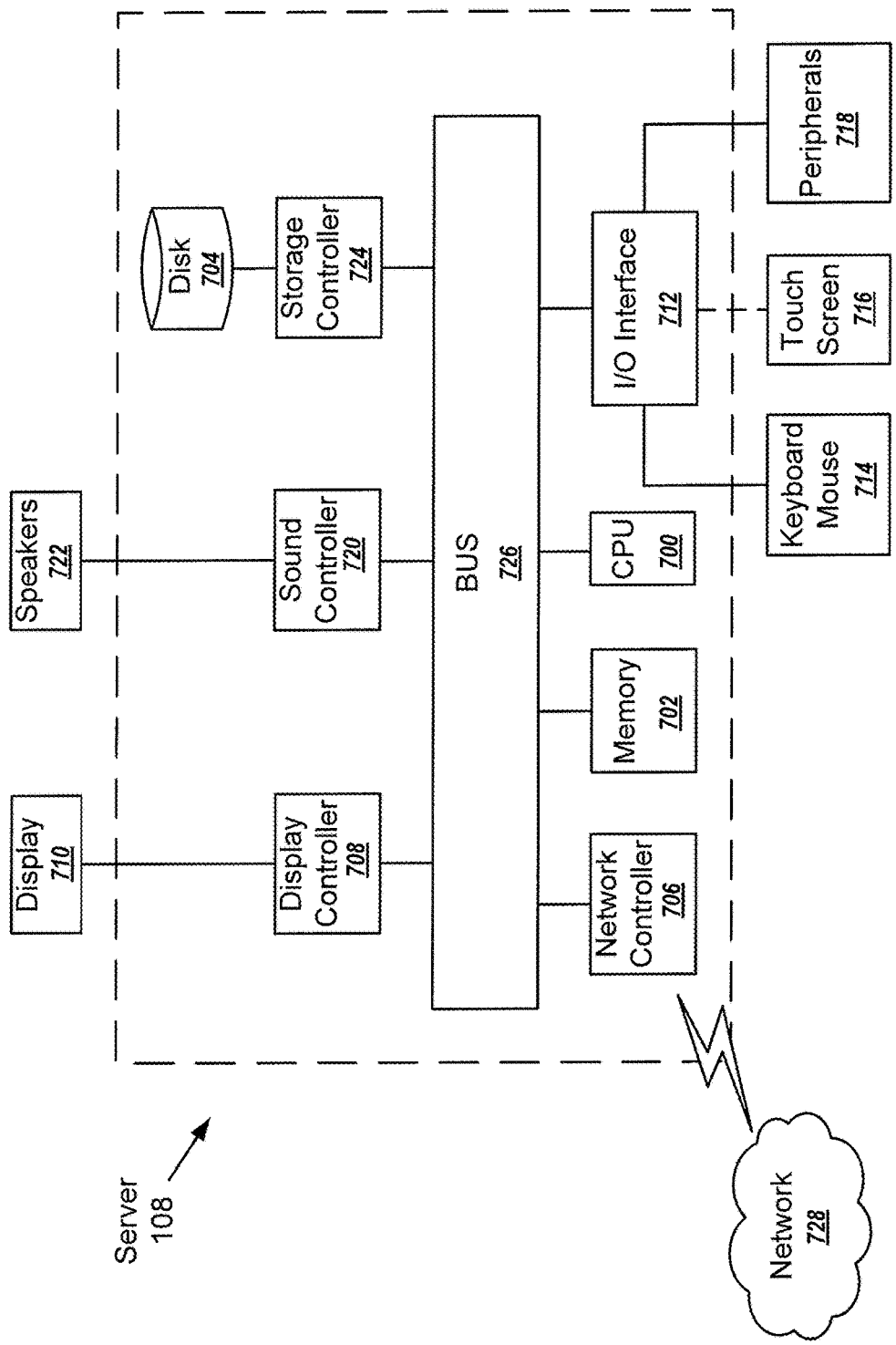
FIG. 7 is a hardware block diagram of a server according to one or more exemplary aspects of the disclosed subject matter.

FIG. 7 is a hardware block diagram of a server (e.g., server 108) according to one or more exemplary aspects of the disclosed subject matter.

Next, a hardware description of the server 108 according to exemplary embodiments is described with reference to FIG. 7. In FIG. 7, the server 108 includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 108 communicates, such as a server or computer.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

The hardware elements in order to achieve the server 108 may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The server 108 in FIG. 7 also includes a network controller 706, such as an Intel Ethernet PRO network interface card from Intel Corporation of America, for interfacing with network 728. As can be appreciated, the network 728 can be a public network, such as the Internet, or a private network such as an LAN or WAN network, or any combination thereof and can also include PSTN or ISDN sub-networks. The network 728 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 108 further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the server 108, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the server 108. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method of reconstructing 3D radio frequency tomographic images, comprising:
   detecting, via a server including processing circuitry, a plurality of frequencies of a target based on received radar signals from one or more receivers, the plurality of frequencies being within a predetermined bandwidth;
   generating, via the processing circuitry, a low resolution image for each of the plurality of frequencies, each low resolution image having unique information based on one or more transmitters and the one or more receivers being deployed in a multistatic mode;
   selecting, via the processing circuitry, a high frequency low resolution image from the plurality of low resolution images to be a reference image;
   comparing, via the processing circuitry, pixel values of the reference image to each of the plurality of low resolution images;
   determining, via the processing circuitry, new features in each of the low resolution images based on the compared pixel values; and
   generating, via the processing circuitry, a high resolution grid based on the new features determined by the compared pixel values, wherein the high resolution grid is generated using interpolation.

2. The method of claim 1, wherein each low resolution image provides electric field response data at each pixel location of the low resolution image.

3. The method of claim 1, further comprising:
   generating a super-resolution Radar tomographic image via a regression analysis of the high resolution grid.

4. The method of claim 1, wherein the one or more transmitters and the one or more receivers in the multistatic mode provide a scattering field of the target.

5. The method of claim 4, wherein the scattering field of the target includes at least one of a null value and a peak value.

6. The method of claim 1, further comprising:
   generating, via the processing circuitry, an improved high resolution grid by performing a deconvolution of the high resolution grid using a Wiener filter.

7. The method of claim 1, wherein generating the low resolution image for each frequency further includes:
receiving an electric field response matrix for each frequency of the plurality of frequencies of the predetermined bandwidth, the electric field response matrix being based on a calculation of an electric field response of a scanned source to a location of the one or more receivers;
determining if a low resolution image has been generated for each frequency of the plurality of frequencies of the predetermined bandwidth; and
when the low resolution image has been generated for a frequency in the predetermined bandwidth, registering the low resolution image for the frequency in the predetermined bandwidth with the reference image to create a registered reference image.

8. The method of claim 7, wherein generating the high resolution grid further includes:
receiving the low resolution image for each frequency; and
estimating, based on a comparison of the low resolution image with the registered reference image, new features of the registered reference image.

9. A system for reconstructing 3D radio frequency tomographic images, comprising:
an imaging system including transmitters and receivers configured to measure scattering of a scanned source; and
a server coupled to the imaging system via a network, the server including processing circuitry configured to
detect a plurality of frequencies of a target using the imaging system based on received radar signals from one or more receivers, the plurality of frequencies being within a predetermined bandwidth,
generate a low resolution image for each of the plurality of frequencies each low resolution image having unique information based on one or more transmitters and the one or more receivers being deployed in a multistatic mode,
select a high frequency low resolution image from the plurality of low resolution images to be a reference image,
compare pixel values of the reference image to each of the plurality of low resolution images,
determine new features in each of the low resolution images based on the comparisons,
generate a high resolution grid based on the new features determined by the comparisons, wherein the high resolution grid is generated using interpolation, and
generate an improved high resolution grid by performing a deconvolution of the high resolution grid using a Wiener filter.

10. The system for reconstructing 3D radio frequency tomographic images according to claim 9, wherein each low resolution image provides electric field response data at each pixel location of the low resolution image.

11. The system for reconstructing 3D radio frequency tomographic images according to claim 9, wherein the processing circuitry is further configured to:
generate a super-resolution Radar tomographic image via a regression analysis of the high resolution grid.

12. The system for reconstructing 3D radio frequency tomographic images according to claim 9, wherein the one or more transmitters and the one or more receivers in the multistatic mode provide a scattering field of the target.

13. The system for reconstructing 3D radio frequency tomographic images according to claim 12, wherein the scattering field of the target includes at least one of a null value and a peak value.

14. The system for reconstructing 3D radio frequency tomographic images according to claim 13, wherein generating the high resolution grid further includes:
receiving the low resolution image for each frequency, and
estimating, based on a comparison of the low resolution image with the registered reference image, new features of the registered reference image.

15. The system for reconstructing 3D radio frequency tomographic images according to claim 9, wherein the processing circuitry is further configured to generate the low resolution image for a specific frequency, wherein generating the low resolution image for a specific frequency further includes:
receiving an electric field response matrix for each frequency of the plurality of frequencies of the predetermined bandwidth, the electric field response matrix being based on a calculation of an electric field response of a scanned source to a location of the receivers;
determining if a low resolution image has been generated for each frequency of the predetermined amount of frequencies in the bandwidth based on the electric field response matrix; and
when the low resolution image has been generated for a frequency in the predetermined bandwidth, registering the low resolution image for the frequency in the predetermined bandwidth with the reference image to create a registered reference image.

16. A non-transitory computer-readable storage medium storing computer-readable instructions that, when executed by a computer, cause the computer to perform a method of:
detecting a plurality of frequencies of a target based on received radar signals from one or more receivers, the plurality of frequencies being within a predetermined bandwidth;
generating a low resolution image for each of the plurality of frequencies, each low resolution image having unique information based on one or more transmitters and the one or more receivers being deployed in a multistatic mode;
selecting a high frequency low resolution image from the plurality of low resolution images to be a reference image;
comparing pixel values of the reference image to each of the plurality of low resolution images;
determining, via processing circuitry, new features in each of the low resolution images based on the compared pixel values;
generating a high resolution grid based on the new features determined by the compared pixel values, wherein the high resolution grid is generated using interpolation; and
generating an improved high resolution grid by performing a deconvolution of the high resolution grid using a Wiener filter.

17. The non-transitory computer readable storage medium of claim 16, wherein each low resolution image provides electric field response data at each pixel location of the low resolution image.

18. The non-transitory computer readable storage medium of claim 16, wherein the method further comprises:

generating a super-resolution Radar tomographic image via a regression analysis of the high resolution grid.

19. The non-transitory computer readable storage medium of claim 16, wherein generating the low resolution image for a specific frequency further includes:
receiving an electric field response matrix for each frequency of the plurality of frequencies of the predetermined bandwidth, the electric field response matrix being based on a calculation of an electric field response of a scanned source to a location of the receivers;
determining if a low resolution image has been generated for each frequency of the plurality of frequencies in the predetermined bandwidth based on the electric field response matrix; and
when the low resolution image has been generated for a frequency in the predetermined bandwidth, registering the low resolution image for the frequency of the plurality of frequencies of the predetermined bandwidth with the reference image to create a registered reference image.

20. The non-transitory computer readable storage medium of claim 19, wherein generating the high resolution grid further includes:
receiving the low resolution images for each frequency; and
estimating, based on a comparison of the low resolution image with the registered reference image, new features of the registered reference image.

* * * * *